United States Patent
Tsirkin et al.

(10) Patent No.: US 9,280,379 B2
(45) Date of Patent: Mar. 8, 2016

(54) HIBERNATION VIA PARAVIRTUALIZATION

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 430 days.

(21) Appl. No.: 13/407,699

(22) Filed: Feb. 28, 2012

(65) Prior Publication Data

US 2013/0227553 A1    Aug. 29, 2013

(51) Int. Cl.
*G06F 1/00* (2006.01)
*G06F 9/455* (2006.01)

(52) U.S. Cl.
CPC .. *G06F 9/45558* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 2005/0268078 A1* | 12/2005 | Zimmer et al. | 713/1 |
| 2006/0085794 A1* | 4/2006 | Yokoyama | 718/100 |
| 2010/0115315 A1* | 5/2010 | Davis et al. | 713/323 |
| 2010/0162242 A1* | 6/2010 | Grouzdev | 718/1 |
| 2010/0192149 A1* | 7/2010 | Lathrop et al. | 718/1 |
| 2010/0218183 A1* | 8/2010 | Wang et al. | 718/1 |
| 2011/0055830 A1* | 3/2011 | Kamay et al. | 718/1 |
| 2011/0225459 A1* | 9/2011 | Fahrig et al. | 714/37 |
| 2012/0278800 A1* | 11/2012 | Nicholas et al. | 718/1 |
| 2013/0227554 A1* | 8/2013 | Tsirkin et al. | 718/1 |

* cited by examiner

*Primary Examiner* — Abdullah Al Kawsar
(74) *Attorney, Agent, or Firm* — Lowenstein Sandler LLP

(57) ABSTRACT

A system and method for hibernating virtual machines (VMs) are disclosed. In accordance with one embodiment, a computer system that executes a hypervisor and a virtual machine (VM) receives a request from a first virtual processor of the VM to put the VM to sleep. In response, the hypervisor stops a second virtual processor of the VM.

20 Claims, 4 Drawing Sheets

HIBERNATION VIA PARAVIRTUALIZATION

TECHNICAL FIELD

This disclosure relates to computer systems, and more particularly, to hibernation in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, in either a one-to-one or one-to-many fashion, to a physical device of the host machine (e.g., a network interface device, a CD-ROM drive, etc.). The hypervisor typically manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
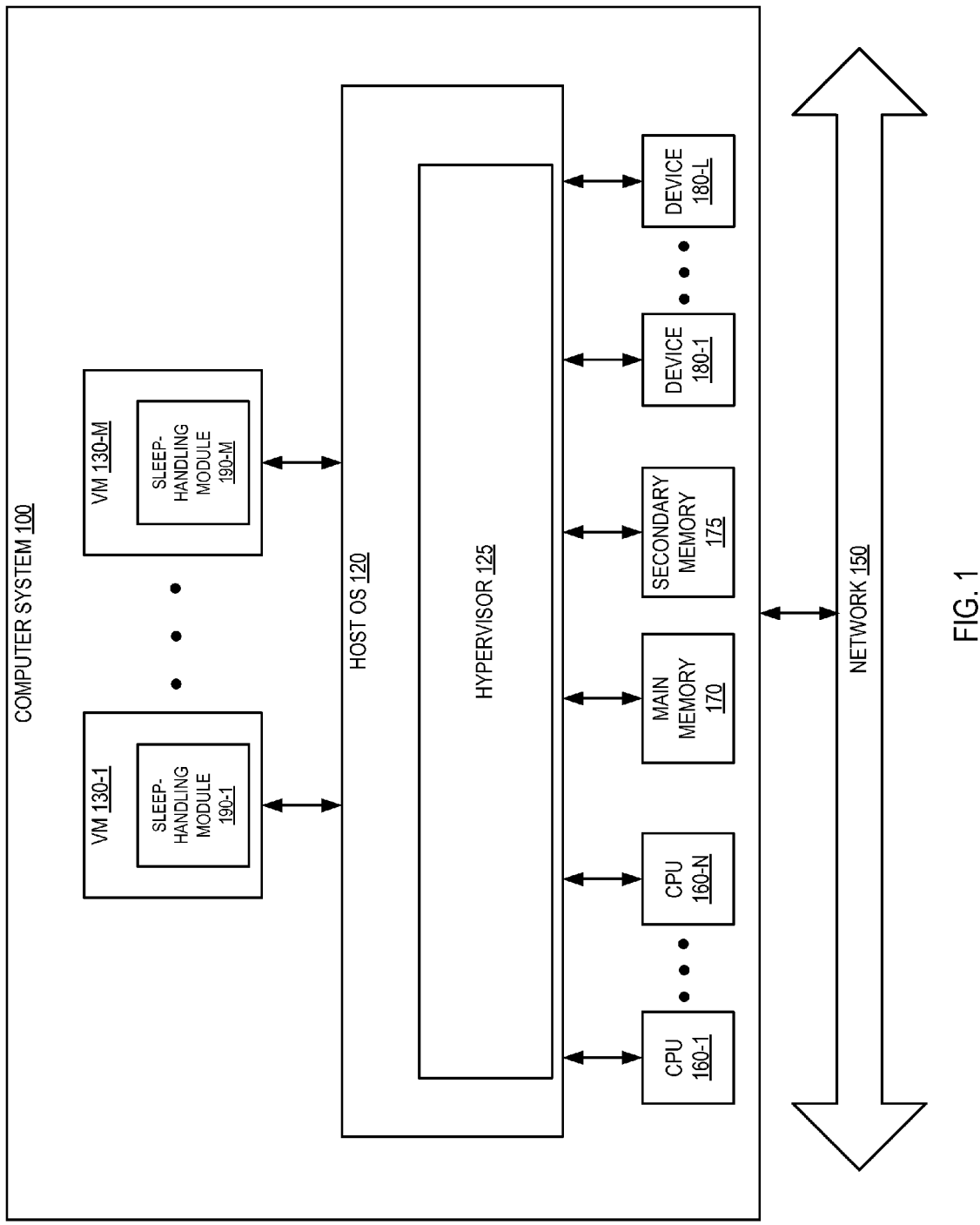
FIG. 1 depicts an exemplary computer system architecture, in accordance with an embodiment of the present invention.

Described herein is a system and method for hibernating virtual machines. Hibernation may refer to a technique by which a physical machine is put to sleep (e.g., in response to a lack of activity, etc.) in order to conserve power. Hibernation of a physical machine may be performed by the operating system (OS) and may involve the following operations:

the OS stops the physical devices (e.g., a network interface device, a CD-ROM drive, etc.) of the physical machine (e.g., by changing the devices' states from d0 to d1 or higher, etc.);

the OS stops the central processing units (CPUs) of the physical machine (e.g., by one of the CPUs synchronizing with the other CPUs and all of the CPUs changing states from s0 to s1 or higher, etc.);

the OS stores the state of the physical machine to memory (e.g., random access memory [RAM], disk, etc.); and the OS suspends itself.

Subsequently, when the operating system receives a wake event, the OS may perform the following operations:

the OS re-starts the CPUs (e.g., by changing the CPUs' states back to s0, etc.);

the OS re-starts the physical devices (e.g., by changing the devices' states back to d0, etc.); and the OS loads the state of the physical machine back from memory.

In accordance with embodiments of the present invention, a virtual machine may be hibernated based on "paravirtualization," a technique by which a guest operating system is modified and recompiled to execute on top of a hypervisor. More particularly, a special command may be added to the guest operating system that instructs a virtual processor of the virtual machine to invoke a sleep function of the hypervisor. The sleep function of the hypervisor hibernates the virtual machine by stopping virtual processors and virtual devices of the virtual machine, and optionally, saving the state of the virtual machine to memory (e.g., random access memory [RAM], disk, etc.).

Subsequently, when the hypervisor receives a signal that the virtual machine should be woken up (e.g., a signal generated by an external event, etc.), the hypervisor may perform the following operations:

the hypervisor loads the state of the virtual machine from memory (if it was saved prior to hibernation);

the hypervisor re-starts the virtual processors of the virtual machine that did not submit the sleep request;

the hypervisor re-starts the virtual processor of the virtual machine that did submit the sleep request; and optionally, the hypervisor transmits to the virtual machine a signal that indicates that the virtual machine has exited a stopped state.

In one embodiment, a sleep-handling module of the virtual machine is responsible for detecting when it may be advantageous to put the virtual machine to sleep (e.g., when the virtual machine is idle, etc.), and for submitting the special command that instructs one of the virtual processors to invoke the hypervisor's sleep function. Some alternative embodiments, however, may not employ such a sleep-handling module, and may instead submit the special command via some other mechanism.

Embodiments of the present invention are thus capable of hibernating individual virtual machines, and of providing the power savings associated with hibernation. In addition, because embodiments of the present invention do not require synchronization to stop virtual processors, the complexity and added latency imposed by such synchronization is avoided.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "storing", "stopping", "re-starting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises one or more central processing units (CPUs) 160, main memory 170, which may include volatile memory devices (e.g., random access memory (RAM)), non-volatile memory devices (e.g., flash memory), and/or other types of memory devices, secondary memory 175 (e.g., one or more hard disk drives, solid-state drives, etc.), and one or more devices 180 (e.g., a network interface device, a CD-ROM drive, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which is software that manages the hardware resources of the computer system and that provides functions such as interprocess communication, scheduling, memory management, and so forth. In one embodiment, host operating system 120 also comprises a hypervisor 125, which is software that provides a virtual operating platform for a set of virtual machines (VMs) 130-1 through 130-M and that manages the execution of these virtual machines. In accordance with this embodiment, hypervisor 125 also provides a sleep function that, when invoked by a particular virtual machine 130, puts that virtual machine to sleep, as described below with respect to FIGS. 2 and 3. It should be noted that in some alternative embodiments, hypervisor 125 may be external to host OS 120, rather than embedded within host OS 120.

Each virtual machine (VM) 130 is a software implementation of a machine that executes programs as though it were an actual physical machine. In addition, each virtual machine (VM) 130 has a sleep-handling module 190. The virtual machine and sleep-handling module are described in more detail below with respect to FIG. 2.

Figure 2:
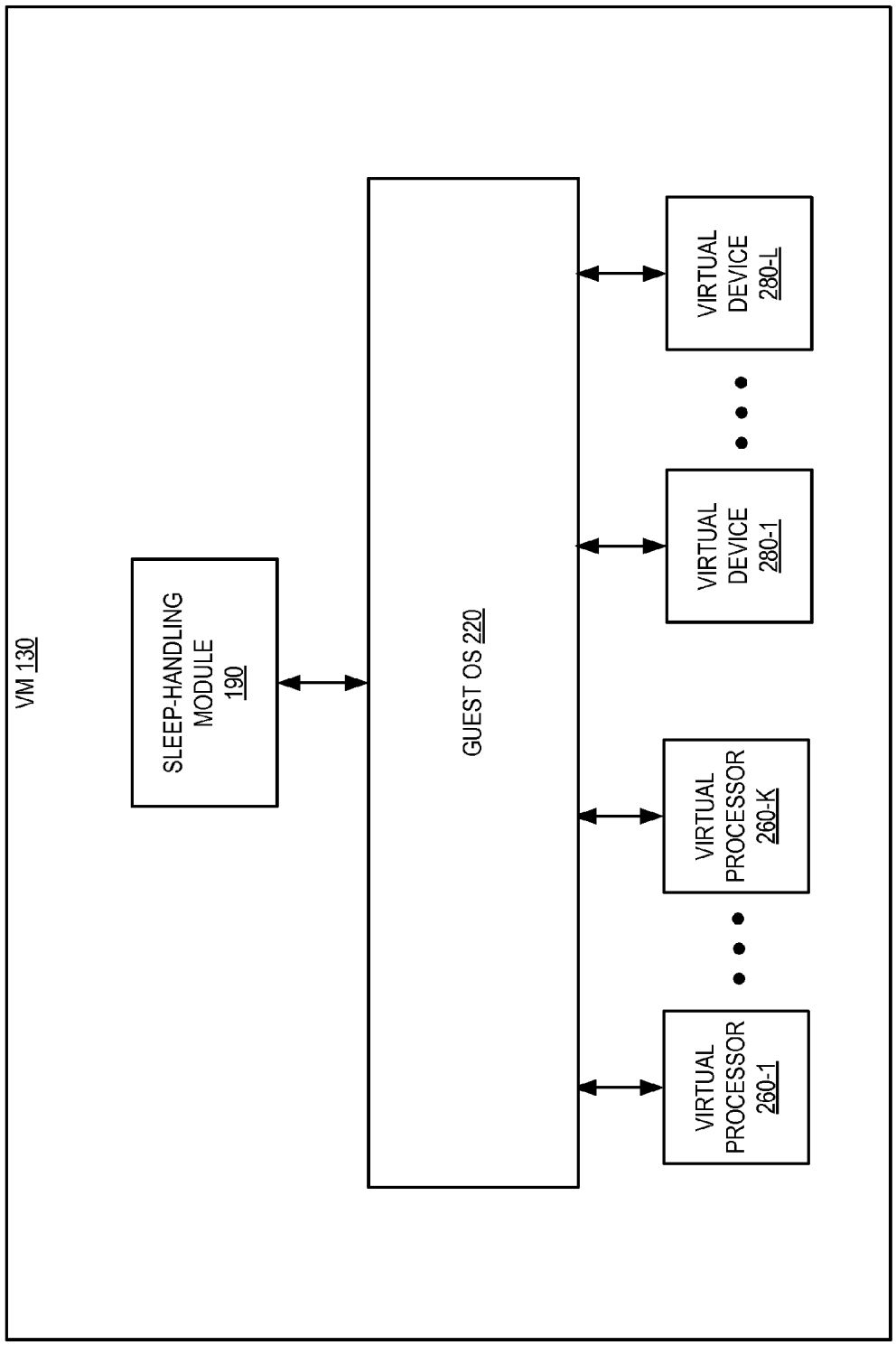
FIG. 2 depicts a block diagram of elements of a virtual machine, in accordance with an embodiment of the present invention.

FIG. 2 depicts a block diagram of elements of virtual machine (VM) 130, in accordance with an embodiment of the present invention. As shown in FIG. 2, virtual machine 130 comprises a guest operating system (OS) 220, one or more virtual processors 260, one or more virtual devices 280, and sleep-handling module 190.

Guest operating system (OS) 220 is software that manages computer resources and provides functions such as interprocess communication, scheduling, memory management, and so forth. Each virtual processor 260 is software that emulates a physical processor, and that maps to one of central processing units (CPU) 160, possibly in a many-to-one fashion. It should be noted that the number of virtual processors may or may not be the same as the number of CPUs (i.e., K may or may not equal N).

Each virtual device 280 is software that emulates a physical device and that maps to one of devices 180. In one embodiment, the mapping between virtual devices 280 and devices 180 is one-to-one, while in some other embodiments, the number of virtual devices 280 may not be the same as the number of devices 180, and/or the mapping may not be one-to-one. In one embodiment, hypervisor 125 manages these mappings in a transparent fashion, so that guest OS 220 and applications executing on virtual machine 130 interact with virtual processors 260 and virtual devices 280 as though they were actual physical entities.

Sleep-handling module 190 is software that detects when it may be advantageous to put virtual machine 130 to sleep (e.g., when virtual machine 130 is idle, etc.) and, upon such detection, instructs one of virtual processors 260 to invoke a sleep function of hypervisor 125.

Figure 3:
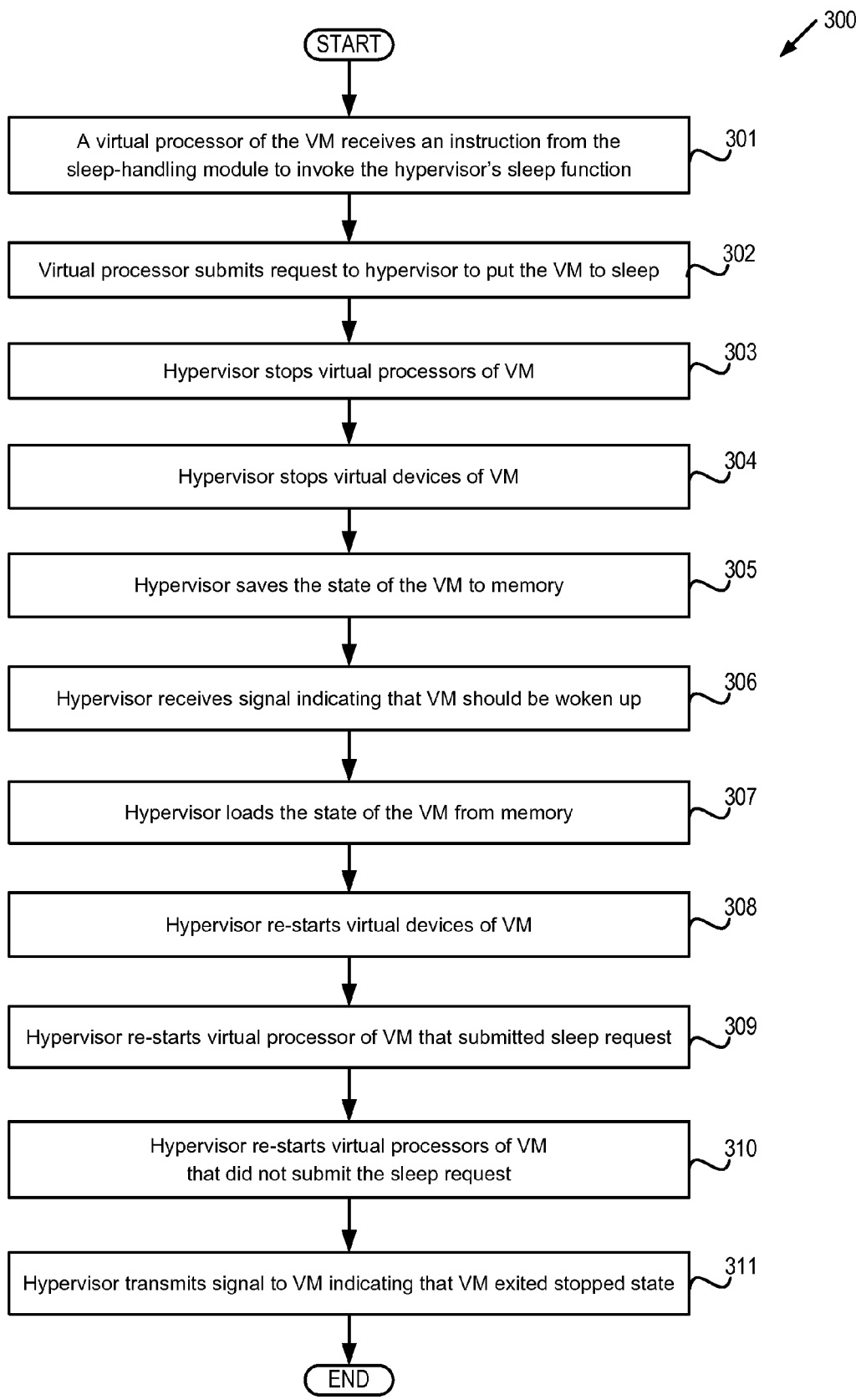
FIG. 3 depicts a flow diagram of one embodiment of a method for managing hibernation of a virtual machine via paravirtualization.

FIG. 3 depicts a flow diagram of one embodiment of a method 300 for managing hibernation of virtual machine 130. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 3 can be performed simultaneously or in a different order than that depicted.

At block 301, a virtual processor 260 of virtual machine 130 receives an instruction from sleep-handling module 190 to invoke hypervisor 125's sleep function. Virtual machine 130 may issue the instruction for any number of reasons, such as when the virtual machine is blocked, when there is a lack of activity, and so forth. The particular virtual processor 260 that receives the instruction may be determined by a scheduler of virtual machine 130, or may be associated with one of the virtual devices present in virtual machine 130.

At block 302, hypervisor 125 re-starts the virtual processors 260 of virtual At block 302, the virtual processor 260 that received the instruction at block 301 submits a request to hypervisor 125 to put virtual machine 130 to sleep. In some embodiments the virtual processor 260 may automatically submit the request, while in some other embodiments the virtual processor 260 might submit the request only when one or more conditions are satisfied, such as when there are more than one virtual processors present in virtual machine 130, when a hypervisor with fast hibernation support is enabled, when a user has indicated the need for fast hibernation, and so forth. In some implementations, virtual processor 260 may submit the request via a command that is different than a central processing unit (CPU) halt command.

At block 303, hypervisor 125 stops virtual processors 260 of virtual machine 130. In some embodiments, all virtual processors 260 may be stopped by hypervisor 125, while in some other embodiments a subset of virtual processors 260 may be stopped.

At block 304, hypervisor 125 stops virtual devices 280 of virtual machine 130. In some embodiments, all virtual devices 280 may be stopped by hypervisor 125, while in some other embodiments a subset of virtual devices 280 may be stopped.

At block 305, hypervisor 125 saves the state of virtual machine 130 to memory (e.g., main memory 170, second memory 175, or both). It should be noted that block 305 is optional, and that some alternative embodiments may omit this block.

At block 306, hypervisor 125 receives a signal indicating that virtual machine 130 should be woken up (e.g., in response to an external event, a timeout, etc.). At block 307, hypervisor 125 loads the state of virtual machine 130 from memory. It should be noted that in embodiments where block 305 is omitted, block 307 is also omitted.

At block 308, hypervisor 125 re-starts virtual devices 280 of virtual machine 130. At block 309, hypervisor 125 re-starts the one virtual processor 260 that received the instruction from sleep-handling module 190 at block 301.

At block 310, hypervisor 125 re-starts the virtual processors 260 of virtual machine 130 that did not receive the instruction from sleep-handling module 190 at block 301. As noted above, blocks of method 300 may be performed in a different order than that depicted in FIG. 3, and thus in some implementations block 310 may be performed prior to block 309. At block 311, hypervisor 125 transmits a signal to virtual machine 130 that indicates that the virtual machine exited a stopped state. It should be noted that block 311 is optional, and that some alternative embodiments may omit this block.

Figure 4:
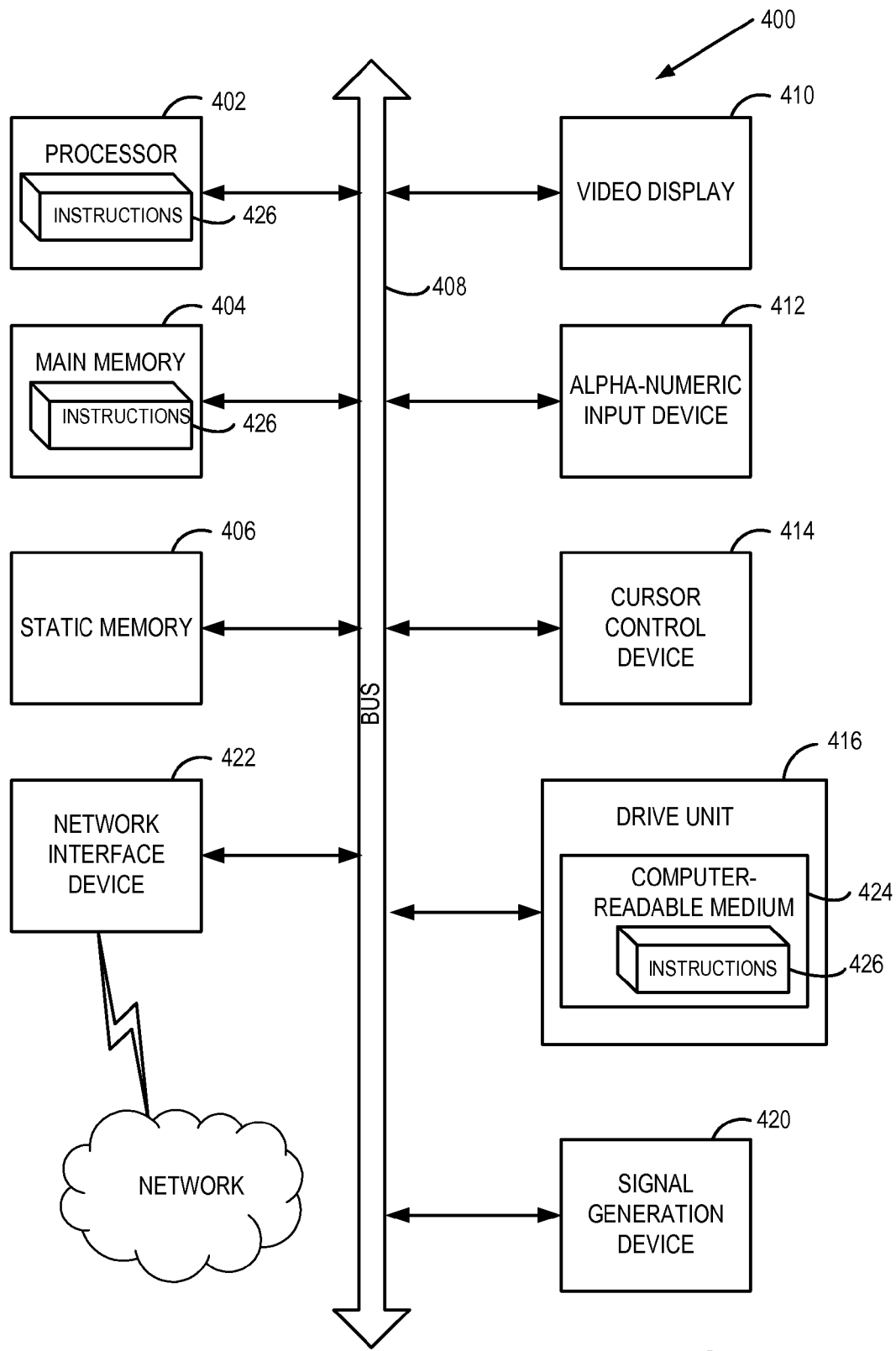
FIG. 4 depicts a block diagram of an illustrative computer system operating in accordance with embodiments of the invention.

FIG. 4 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer readable storage medium having instructions stored therein that, when executed by at least one processing device, cause a hypervisor executed by the at least one processing device to:
   receive, by the hypervisor from a first virtual processor of a virtual machine (VM), a request that the hypervisor put the virtual machine to sleep;
   stop, by the hypervisor, in response to the request, the first virtual processor and a second virtual processor of the VM, wherein the second virtual processor is stopped before the first virtual processor is stopped; and
   re-start, by the hypervisor, the first virtual processor and the second virtual processor in response to a wake event, wherein the second virtual processor is re-started after the first virtual processor is re-started.

2. The non-transitory computer readable storage medium of claim 1, wherein the VM comprises a third virtual processor, and wherein the hypervisor does not stop the third virtual processor in response to the request.

3. The non-transitory computer readable storage medium of claim 1, wherein the VM comprises a guest operating system (OS), and wherein the request by the first virtual processor is in response to receiving, by the first virtual processor, an instruction to the first virtual processor from an entity of the VM external to the guest OS.

4. The non-transitory computer readable storage medium of claim 1, wherein the instructions further cause the hypervisor executed by the at least one processing device to:
   stop, by the hypervisor, one or more virtual devices of the virtual machine in response to the request; and
   re-start, by the hypervisor, the one or more virtual devices in response to the wake event.

5. The non-transitory computer readable storage medium of claim 1, wherein the instructions further cause the hypervisor executed by the at least one processing device to transmit to the virtual machine a signal that indicates that the virtual machine has exited a stopped state.

6. The non-transitory computer readable storage medium of claim 1, wherein the request is submitted via a command that is different than a central processing unit (CPU) halt command.

7. The non-transitory computer readable storage medium of claim 1, wherein the instructions further cause the hypervisor executed by the at least one processing device to:
   store, by the hypervisor, the state of the virtual machine to a memory in response to the request; and
   load, by the hypervisor, the state of the virtual machine from the memory in response to the wake event.

8. A method comprising:
   receiving, from a first virtual processor of a virtual machine (VM), by a hypervisor executed by at least one processing device, a request that the hypervisor put the virtual machine to sleep;
   stopping, by the hypervisor, in response to the request, the first virtual processor and a second virtual processor of the VM, wherein the second virtual processor is stopped before the first virtual processor is stopped; and
   re-starting, by the hypervisor, the first virtual processor and the second virtual processor in response to a wake event, wherein the second virtual processor is re-started after the first virtual processor is re-started.

9. The method of claim 8, wherein the VM comprises a third virtual processor, and wherein the hypervisor does not stop the third virtual processor in response to the request.

10. The method of claim 8, wherein the VM comprises a guest operating system (OS), and wherein the request by the first virtual processor is in response to receiving, by the first virtual processor, an instruction to the first virtual processor from an entity of the VM external to the guest OS.

11. The method of claim 8, further comprising:
    stopping, by the hypervisor, one or more virtual devices of the virtual machine in response to the request; and
    re-starting, by the hypervisor, the one or more virtual devices in response to the wake event.

12. The method of claim 8 further comprising transmitting to the virtual machine, by the hypervisor, a signal that indicates that the virtual machine has exited a stopped state.

13. The method of claim 8, wherein the request is submitted via a command that is different than a central processing unit (CPU) halt command.

14. The method of claim 8, further comprising:
    storing, by the hypervisor, the state of the virtual machine to a memory in response to the request; and
    load, by the hypervisor, the state of the virtual machine from the memory in response to the wake event.

15. An apparatus comprising:
    a memory; and
    at least one processing device, operatively coupled to the memory, to execute a hypervisor to:
       receive, from a first virtual processor of a virtual machine (VM), a request that the hypervisor put the virtual machine to sleep;
       stop, by the hypervisor, in response to the request, the first virtual processor and a second virtual processor of the VM, wherein the second virtual processor is stopped before the first virtual processor is stopped; and
       re-start, by the hypervisor, the first virtual processor and the second virtual processor in response to a wake event, wherein the second virtual processor is re-started after the first virtual processor is re-started.

16. The apparatus of claim 15, wherein the VM comprises a third virtual processor, and wherein the hypervisor does not stop the third virtual processor in response to the request.

17. The apparatus of claim 15 wherein the VM comprises a guest operating system (OS), and wherein the request by the first virtual processor is in response to receiving, by the first virtual processor, an instruction to the first virtual processor from an entity of the VM external to the guest OS.

18. The apparatus of claim 15, wherein the hypervisor executed by the at least one processing device is further to:
   stop, by the hypervisor, one or more virtual devices of the virtual machine in response to the request; and
   re-start, by the hypervisor, the one or more virtual devices in response to the wake event.

19. The apparatus of claim 15, wherein the hypervisor executed by the at least one processing device is further to transmit to the virtual machine a signal that indicates that the virtual machine has exited a stopped state.

20. The apparatus of claim 15, wherein the request is submitted via a command that is different than a central processing unit (CPU) halt command.

* * * * *